United States Patent [19]

Breckenridge

[11] Patent Number: 4,694,991

[45] Date of Patent: Sep. 22, 1987

[54] AGRI-CHEMICAL SPREADER

[76] Inventor: Virgil H. Breckenridge, P.O. Box 178, Beedeville, Ark. 72014

[21] Appl. No.: 829,915

[22] Filed: Feb. 18, 1986

[51] Int. Cl.$^4$ .......................... B64D 1/18; B64D 1/00; B05B 1/20
[52] U.S. Cl. .................................... 239/171; 239/176; 244/136
[58] Field of Search .................. 239/171, 176, 666; 244/136; 98/40.24, 40.28, 121.2

[56] References Cited

U.S. PATENT DOCUMENTS

| 2,127,275 | 8/1938 | Streif et al. | 244/136 X |
| 2,772,061 | 11/1956 | Sellers | 239/171 X |
| 3,476,337 | 11/1969 | Cornett | 239/171 X |
| 3,525,473 | 8/1970 | Pickell | 239/171 |
| 4,260,108 | 4/1981 | Maedgen, Jr. | 239/171 |

FOREIGN PATENT DOCUMENTS

| 475899 | 8/1951 | Canada | 239/171 |
| 100536 | 12/1940 | Sweden | 98/40.24 |
| 765091 | 1/1957 | United Kingdom | 244/136 |

Primary Examiner—Andres Kashinikow
Assistant Examiner—Patrick N. Burkhart
Attorney, Agent, or Firm—Stephen D. Carver

[57] ABSTRACT

A spreader for widely broadcasting agri-chemicals from a conventional airplane. Preferably the spreader comprises a central body comprised of an upper and lower top which diverge away from each other between a central front and a rear. The generally wing-shaped spreader includes a front throat having a mouth in which a plurality of spaced apart vane fronts are disposed. The vanes extend in arcuate spaced-apart relationship throughout the interior of the spreader, terminating in pivoted swallow-tail portions. Each swallow-tail portion includes a pair of pivoted tabs which can be adapted to deflect agri-chemicals in a desired fashion. Preferably the throat includes a releasable plate for quick connecting the spreader to the aeroplane, and a front, lower baffle plate may be adjusted to redirect air flow. Upon the opposite lateral outwardly diverging sides of the body two pairs of cooperating air injection chutes are employed. These chutes inject air within the lateral periphery of the spreader so as to insure uniform product output and prevent the creation of aero-dynamic "dead zones" within the apparatus.

8 Claims, 14 Drawing Figures

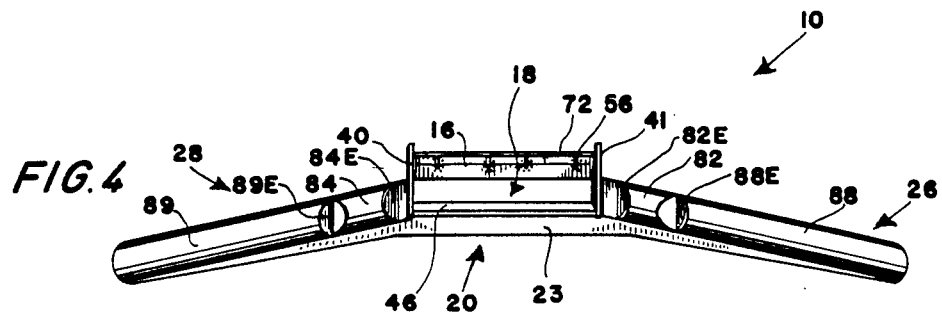
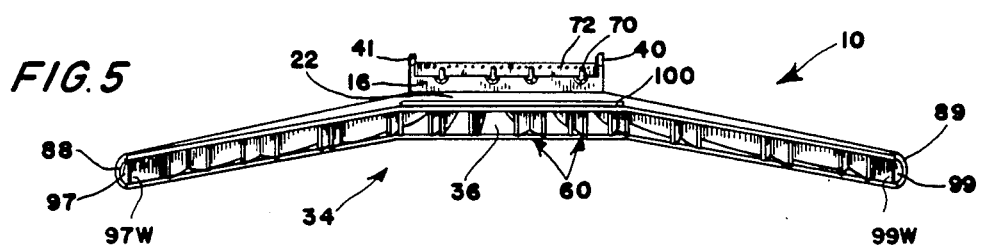
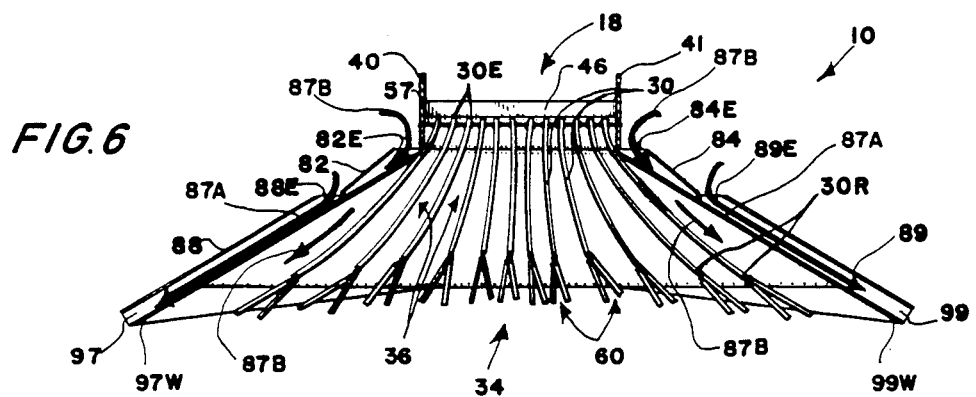
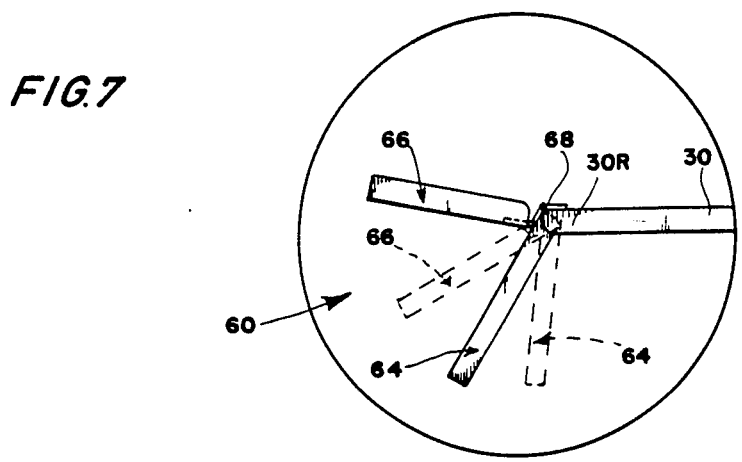

AGRI-CHEMICAL SPREADER

BACKGROUND OF THE INVENTION

The present invention relates generally to agricultural aero-applicator devices for widely broadcasting agri-chemicals. More particularly, the present invention is related to an aerodynamically shaped spreader adapted to uniformly apply agri-chemicals with a minimum of aerodynamic drag and interference.

In the prior art it is well known to dispense various agri-chemicals from the air. However, as will be readily appreciated by those skilled in the art, it is desirable to distribute such chemicals, which may include insecticides, herbicides, or the like, substantially uniformly below the aeroplane so as to properly treat the crop without "overdosing" or missing any particular row or column. Therefore a variety of prior art aero-applicator devices have been employed to distribute agri-chemicals.

For example, U.S. Pat. No. 3,777,978 discloses a spreader device consisting of a receptacle disposed beneath a conventional hopper for broadcasting agri-chemicals through a diffusing unit including a plurality of internal vanes. The most relevant prior art known to me is disclosed in U.S. Pat. No. 3,476,337 issued to W. D. Cornett, Jr., on Nov. 4, 1969. This unit includes a spreader device having a divergent body in which an input throat receives agri-chemicals to be subsequently distributed. A plurality of internal vanes extending between the diverging top and bottom of the unit broadcast in what is represented as being a substantially uniform pattern.

Other related devices are seen in U.S. Pat. Nos. 4,412,654, 3,533,582, and 2,772,061. Less related prior art is seen in U.S. Pat. Nos. 1,851,406 and 2,220,082.

However, depending upon a wide variety of conditions encountered in actual agri-chemical spray plane use, the apparatus must be capable of adjustment so as to facilitate homogenous product distribution. In other words, once the conventional hopper of the aeroplane is employed to input the agri-chemical or the like to be dispensed, product passage through the spreader must be substantially homogenous, and uniform diffusion is necessary. These characteristics are increasingly difficult to maintain when varying conditions are encountered by the applicator.

One very important factor to be considered, as will be appreciated by those skilled in flying, of course relates to the direction of prop rotation. Most single engine planes have clockwise prop rotation. Clockwise rotation will produce opposite effects upon the outputted spray than will counterclockwise rotation. In other words, prop rotation establishes a non-symmetrical air flow behind and underneath the aircraft. With normal spreaders it is difficult, if not impossible, for the aviator to compensate for uneven wind effects caused by prop rotation.

Other problems may be caused by prop (P)-Factor, aircraft design, or the presence of aircraft component parts such as landing gears, wing struts, oil coolers and the like. Such factors effect the flow of air around any model or design aircraft and create air turbulence which can greatly affect the distribution of material distributed from spreader devices.

Hence, to provide a reliable spreader unit of versatile characteristics, I have found it necessary to provide a variety of adjustments to the unit to vary the output to operationally mate to the individual design of the aircraft. Moreover, in order to avoid "dead zones" within the fluid flow region set up within the vanes of the spreader, I have provided a system for laterally injecting mixing air at the periphery of the device so as to insure substantially homogenous output density, and a uniform output pattern. As a result my spreader may be adjusted to insure uniform application of an agri-chemical upon a target field without the disadvantages characteristic of prior art devices.

SUMMARY OF THE INVENTION

The present invention comprises an aviation spreader unit adapted to be employed with conventional aeroplanes to provide a uniform, homogenous product output upon an intended crop and/or field.

In the preferred embodiment the spreader comprises a generally rigid, box-like V-shaped main body portion, the front of which comprises a throat adapted to receive the agri-chemical to be broadcast by the spreader. The main body portion of the spreader diverges towards the rear, and it includes a top and bottom separated by spaced-apart, angled sides so as to form an input throat. The mouth of the throat receives incoming agri-chemical by air pressure during the travel of the aeroplane. A plurality of arcuate vanes are spaced-apart within the interior of the spreader, and they originate at the mouth portion of the throat, being held together in spaced-apart relation by a suitable threaded and adjustable anchor rod. The vanes terminate at the rear of the spreader, and each is coupled to a suitable "swallow-tail" vane device consisting of a pair of separately pivoted, cooperating tabs.

By adjusting each of the tabs as desired to vary the output pattern, the aviator may compensate for uneven wind effects caused by prop rotation, prop (P)-Factor, aircraft design, aircraft component parts such as landing gears, wing struts, oil coolers and the like. Further, the tabs can be adjusted to vary the pressure between the vanes. Moreover, the user may compensate for the latter factors whether or not they are primarily experienced over or under the applicator plane or the spreader.

Throat input characteristics may be varied by adjustment of a lower baffle plate which may be angled as desired to increase air input. In the best mode of the invention the upper part of the spreader mouth includes a slotted mounting plate adapted to be removably coupled to a "quick connect" plate which may be semi permanently attached to the underside of the aircraft. The latter plate may be left on the plane even after the spreader is removed, until it needs to be disconnected. In this fashion the spreader may be quickly removed or installed on the aircraft.

Preferably the divergent spreader body is generally in the form of a rearwardly diverging V-shape, and its lateral edges include a pair of scoops defined thereupon for forcibly admitting air into the interior of the apparatus, so as to prevent "dead spots" and the like. These scoops function independently from the throat, and do not receive incoming agri-chemical. Instead, inrushing air forced through these scoops through the lateral confines interiorly of the spreader prevent the formation of dead spots and generate a substantially homogenous product output.

Thus an object of the present invention is to provide a product sprader for use by aviation applicators which provides a uniform, homogenous output.

Another object of the present invention is to provide a versatile spreader which can be adjusted to provide a uniform output in a variety of conditions.

A related object is to provide a spreader of the character described which does not overdose any particular row or column of crops.

Yet another object of the present invention is to allow the applicator to compensate for tubulence caused by prop rotation, prop (P)-Factor, aircraft design, and turbulence caused by aircraft component parts such as landing gears, wing struts, oil coolers and the like. The latter factors cause uneven air flow which can greatly affect the distribution of material from normal spreader devices.

Another important object is to provide a spreader of the character described which may be adjusted by the operator so as to compensate for prop rotation.

Another object of the present invention is to provide a spreader with a plurality of adjustable vanes which may be angularly adjusted to provide a uniform output.

A still further object of the present invention is to provide a spreader of the character describe which may be quickly mounted to or removed from a conventional agri-chemical aircraft.

Another object of the present invention is to provide an air injection system for a product chute or a spreader of the character described which will force air laterally interiorly of the baffle region so as to generate a uniform and consistent product output.

Yet another object of the present invention is to provide or generate a wider swath for the aerial applicator, whereby to reduce the number of required flight passes over the field being treated in order to save fuel and time.

Another fundamental object is to provide a spreader device of the character described in which the input throat may be adjusted in a variety of positions to substantially vary the air intake rate.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be constructed in conjunction therewith, and in which like reference numerals have been employed throughout whenever possible to indicate like parts in the various views:

FIG. 4 is a front elevational view thereof with portions omitted for clarity;

FIG. 5 is a rear plan view thereof;

FIG. 6 is a top sectional view of the spreader with the spreader top sheet metal and other portions omitted for clarity, generally indicating a typical operational orientation of the internal spreader vanes;

FIG. 7 is a greatly enlarged, fragmentary plan view illustrating the preferred swallow-tail terminal end of the internal spreader vane;

DETAILED DESCRIPTION OF THE DRAWINGS

Figure 1:
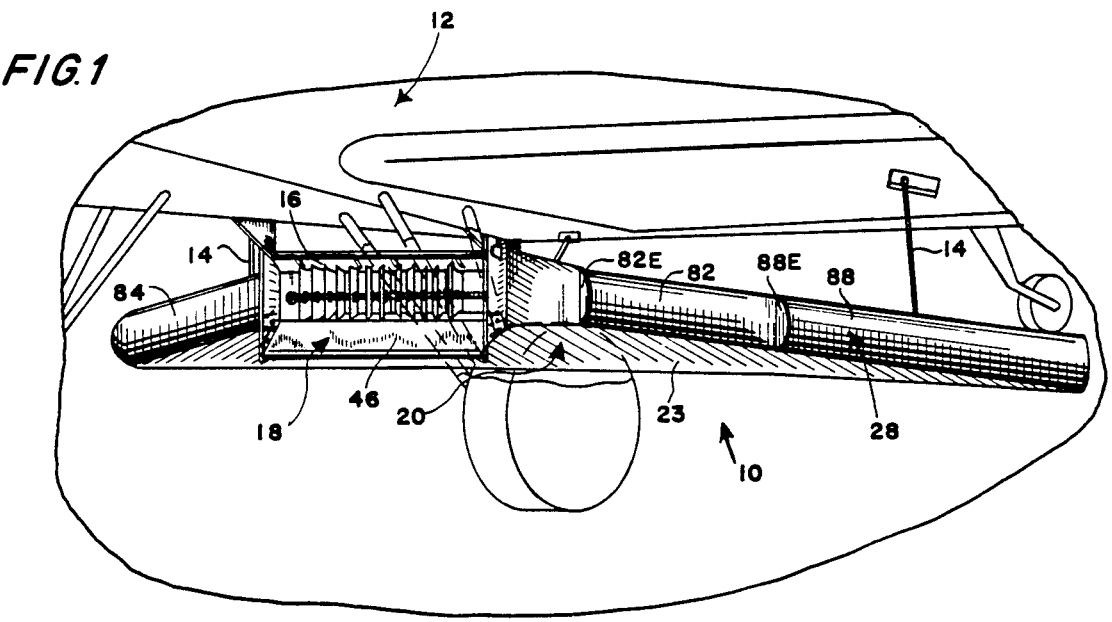
FIG. 1 is a fragmentary pictorial view illustrating the best mode of the present spreader coupled to a conventional agricultural aircraft.

With reference now to the appended drawings, a spreader device constructed in accordance with the best mode of the present invention has been generally designated by the reference numeral 10. Spreader 10 may be coupled to the underside of a conventional aero-applicator plane 12, and it is supported by pairs of spaced-apart mounting straps 14 and by a front mounting plate assembly generally designated by the reference numeral 16. The spreader is designed to receive an agri-chemical to be dispensed from the aeroplane hopper (not shown) directly into the throat 18 of the spreader 10.

With reference now generally directed to FIGS. 2 through 6, the spreader includes a generally V-shaped main body portion generally designated by the reference numberal 20 which includes a top 22, a bottom 23 and a pair of opposite, rearwardly outwardly diverging sides generally designated by the reference numerals 26 and 28. Air entering the throat 18 is confined between top 22 and bottom 23, and between a plurality of arcuate, rearwardly extending vanes 30 which are spaced-apart from one another and which extend generally from the throat (i.e. FIG. 9) in closely spaced-apart relation towards the output end or rear of the spreader, generally designated by the reference numeral 34. It will be noted that a plurality of passageways 36 are defined between adjacent vanes 30, and product entering throat will be forcibly accelerated through these passages 36, and will be broadcast out of the rear of the spreader 34.

Figure 9:
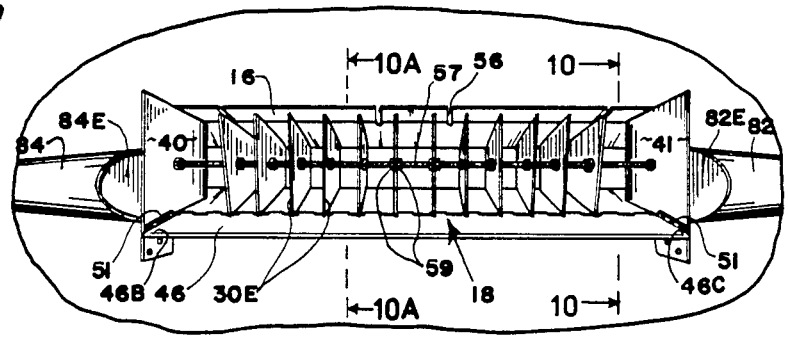
FIG. 9 is an enlarged, fragmentary front view of the spreader primarily illustrating the throat mouth and the lower adjustable baffle.
Figure 10:
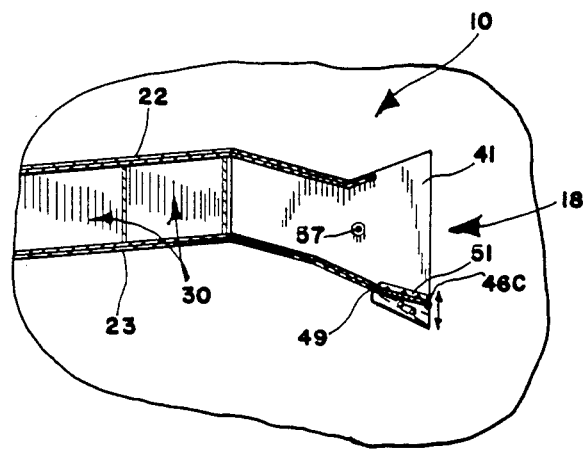
FIG. 10 is an enlarged, fragmentary sectional view taken generally along line 10—10 of FIG. 9.
Figure 10A:
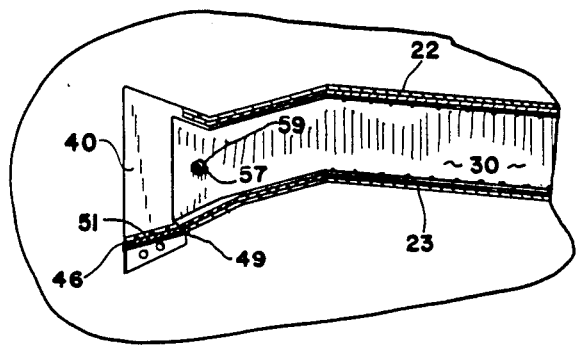
FIG. 10A is an enlarged, fragmentary sectional view taken along line 10A—10A of FIG. 9.
Figure 11:
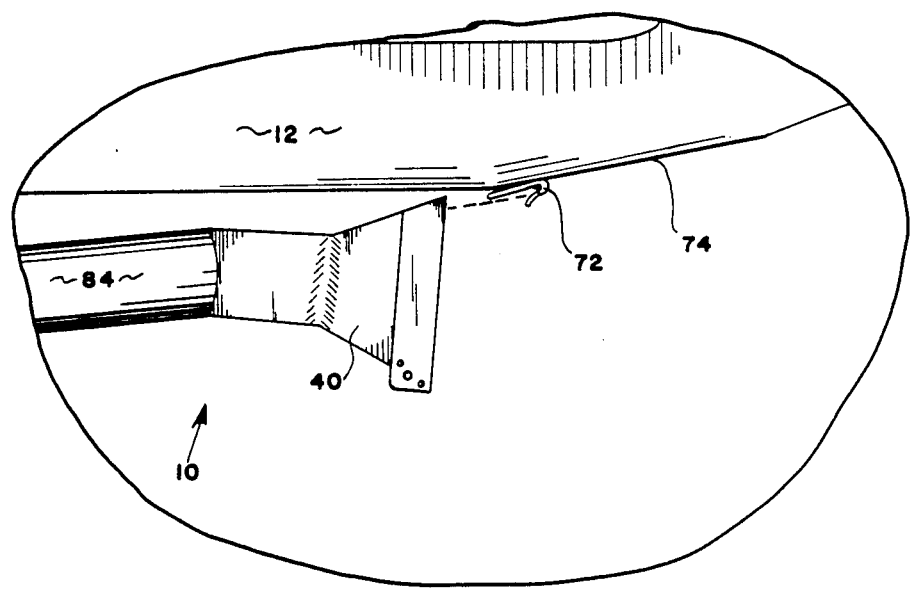
FIG. 11 is an enlarged fragmentary pictorial view illustrating generally how the spreader is releasably coupled to the aeroplane with the quick connect sliding plate to be described.

With reference now directed to FIGS. 1 and 9, the input throat 18 is defined between a pair of spaced-apart, angled side plates 40 and 41 which extend vertically between the front mounting plate 16 and a lower, adjustable baffle plate 46. As best viewed in FIG. 10, the lower baffle plate 46 may be angularly adjusted relative to side plates 40, 41 and it pivots at hinge 49 being secured as desired by the operator at its opposite ends 46B, 46C by suitable tabs 51 which are secured by nut and bolt combinations to opposite side plates 40 and 41. The mounting plate 16 includes suitable notches 56 whose purpose will be hereinafter described.

As viewed in FIG. 9, the throat ends 30E of the various vanes 30 are closely spaced together, and are maintained securely in place by an elongated, threaded rod 57 which extends between side plates 40 and 41 of the throat 18 within the mouth thereof. As will be noted rod 57 is compressively secured to the vane ends 30E by suitble bolts 59 of conventional construction. As the apparatus travels through the air agri-chemical dispensed in a conventional fashion from the aviation hopper will drop down into the proximity of throat 18, being forced through the mouth between the various vanes 30 into the interior confines of the body portion within the passageways 36 (FIG. 6) previously described, by the air flow pressure being created by the forward motion of the plane.

Each of the rear portions, broadly designated by the reference numeral 30R of the vanes 30 terminates in a suitable "swallow-tail" apparatus, each of which has been broadly designated by the reference numeral 60 (FIG. 7). Thus the ends 30R (FIG. 6) are pivotally coupled to a main swallow-tail tab 64 which may be adjusted to a desired position illustrated in dashed lines in FIG. 7. Similarly, a cooperating tab 66 pivotally coupled to tab 64 at 68 may assume a variety of positions.

Figure 8:
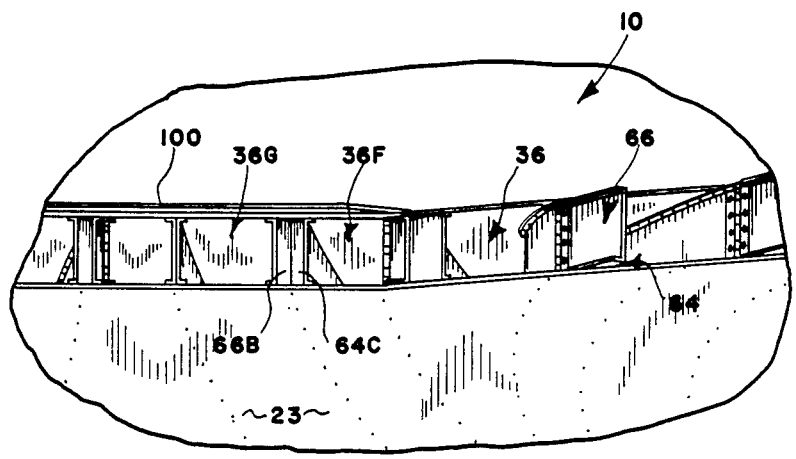
FIG. 8 is an enlarged, fragmentary, pictorial view illustrating the rear of the spreader, disclosing various alternative orientations of the terminal swallow tail vanes.

Thus each of the swallow-tail tab portions may assume a variety of configurations. This allows the air pressure between any given vanes to increase or decrease, whereby to adjust air flow velocity between selected vanes in order to allow for correct positioning of material in the dispersal pattern. Also, movement of the swallow tails will facilitate a wide variety of output angles. For example, in FIG. 8 it will be noted that a pair of representative swallow-tail members 66B and 64C have been oriented so as to provide relatively uniform output from adjacent passageways 36F, 36G. As viewed at the right of FIG. 8, cooperating swallow-tail portions are adjusted more angularly so as to promote greater fluid passage towards the rear.

Figure 2:
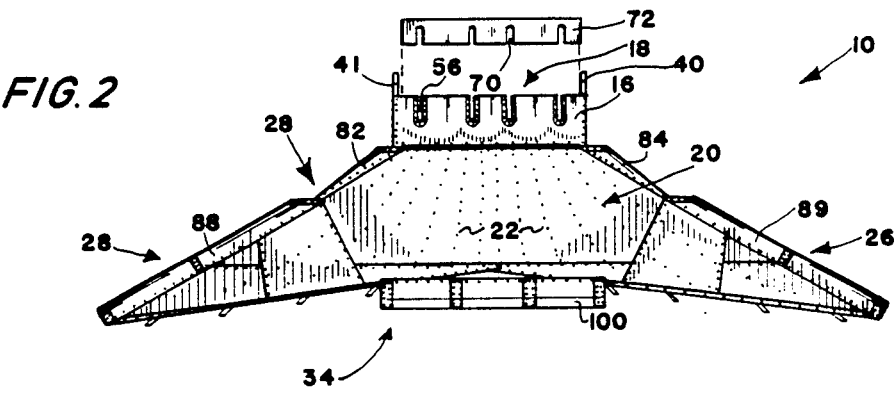
FIG. 2 is a partially exploded, top plan view of the spreader and the preferred quick connect, sliding mounting plate.
Figure 3:
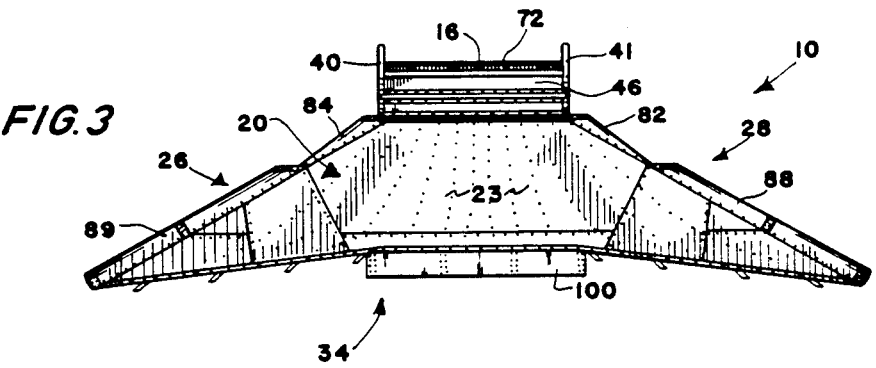
FIG. 3 is a bottom plan view thereof, with the quick connect plate attached.

With reference now to FIG. 2 the mounting plate 16 of the input throat 18, includes a plurality of slots 56 adapted to be forcibly coupled to similar slots 70 in the "quick-connect" plate 72 permanently secured at the underside 74 of the aeroplane 12. It will be noted tht a plurality of nuts and bolts (not shown) aid in securing the quick connection of mounting plate 16 and quick connect plate 72.

Preferably a pair of elongated divergent peripheral chutes are defined on sides 26 and 28 of the main body of the spreader. A first pair of similar chutes 82, 84 originate from the rearward ends of side plates 40, 41 of throat 18, and extend somewhat rearwardly along the sides of the apparatus. The chutes include input orifices 82E and 84E respectively which scoop air and inject it interiorly of the apparatus, resulting in the air flow generally indicated by the arrows 87B, which enters the interior of the spreader. However, air passage as indicated by arrows 87B is separated from the outermost lateral peripheral chutes 88 and 89 by the interior dividing walls 97W and 99W.

The outermost cooperating divergent chutes 88, 89 include similar input orifices 88E and 89E respectively. Air forced into these chutes at the outermost edges of the spreader violently enters the interior of the spreader passageways 97, 99 (FIG. 6) and creates an output vortex which prevents nonuniform dispersal of the output product. The flow is generally indicated by arrows 87A, and walls 97W and 99W prevent the admission of air from these chutes into the agrichemical-bearing interior of the spreader.

In other words, the high velocity air exiting from the chute output passageways 97, 99 in effect provides an aerodynamic border over which broadcast materials cannot pass. In this fashion the output shape of the apparatus is substantially maintained, so that a uniform and consistent homogenous rectangular pattern will be generated by the applicator. In cooperation with this effect, it has been found desirable to provide a generally rectangular deflector plate 100 which is attached to body portion 22 and extends rearwardly from the apparatus to employ further distribution control of the agrichemical being dispensed.

Figure 12:
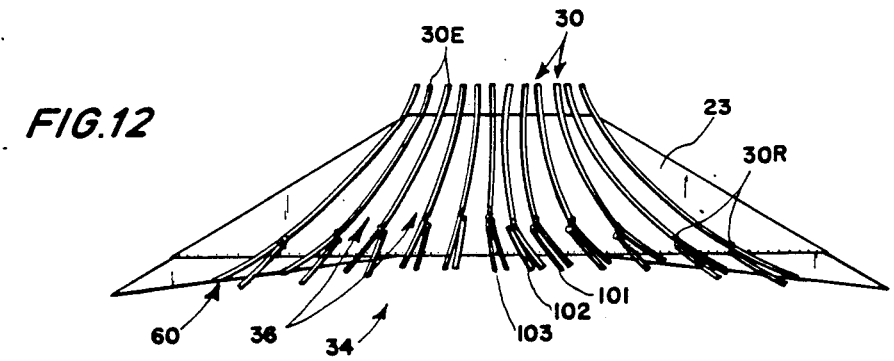
FIG. 12 is a top sectional view of the spreader similar to FIG. 6 with the spreader top sheet metal and other portions omitted for clarity, approximately indicating the swallow tail configuration of the spreader for use with clockwise prop rotation; and, FIG. 13 is a top sectional view of the spreader similar to FIGS. 6 and 12 with the spreader top sheet metal and other portions omitted for clarity, approximately indicating the swallow tail configuration of the spreader for use with counterclockwise prop rotation.
Figure 13:
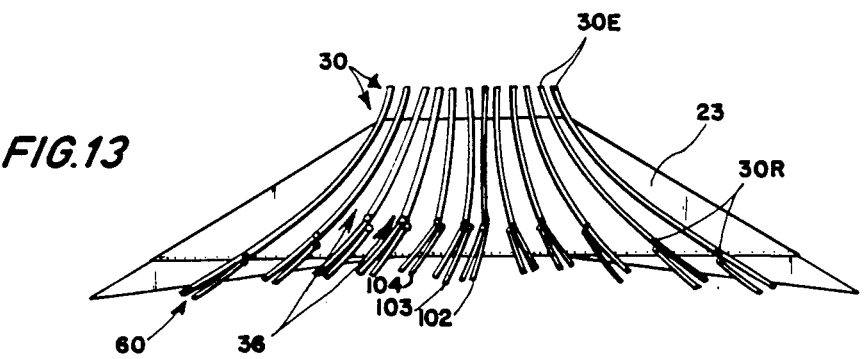

With reference now directed to FIG. 12, the reference numerals 101, 102 and 103 generally indicate how the swallow tail structures may be configured to adapt the spreader for use with planes having clockwise rotating props. Thus swallow tails 101, 102, and 103, for example, a have been "closed" slightly and they have been moved somewhat to the right (as viewed in FIG. 12). FIG. 13 indicates how the swallow tails may be configured for planes having props which rotate in a counterclockwise direction. Thus for example swallow tails 102, 103, and 104 have been deflected somewhat to the left, and the individual elements have been compressed somewhat from the position shown in FIG. 6.

Thus a very important feature of the aforedescribed spreader design is that the air pressure can be controlled between given vanes for more even distribution.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matters herein set forth or shown in the accompanying drawings is to be interpreted as illustrative and not in a limiting sense.

What is claimed is:

1. An output adjustable applicator spreader adapted to be coupled to agricultural spray planes or the like for uniformly widely broadcasting a selected agri-chemical over a selected field or target area, the applicator spreader comprising:

a generally V-shaped main body portion having a central section, a top and a spaced-apart bottom, the top and bottom originating at the mouth of an input throat of a predetermined height and width, and the top and bottom rearwardly diverging to a larger width rear output end;

said mouth being defined between a pair of angled side plates, an upper sprayer mounting plate, and a lower, forward facing angularly adjustable baffle plate adapted to be selectively adjusted for varying the intake rate of air into said spreader main body portion;

said throat comprising a transverse rod for securing the front of each of said vanes in a desired angular position;

said main body portion having a pair of diverging cooperating aerator scoops adjacent the sides of said main body portion adapted to intake and exhaust air during flight of said plane;

a plurality of internal spaced apart, arcuate vanes extending between said top and bottom of said main body having fronts secured in closely spaced apart relation within said mouth and terminating in farther spaced apart ends at said output end, a plurality of internal air passages in fluid flow communication with said mouth being defined between said vanes;

said vanes terminating in angularly adjustable swallow tails for adjusting air pressure and distributing said agri-chemical, said swallow tails comprising a pair of cooperating tabs pivotally coupled at the rear of each of said vanes, each of said tabs being pivotally deflectable relative to the other and relative to said vanes, said tabs adjustable to either:

a position to the left or the right relative to said vanes to compensate for prop (P)-Factor;

a substantially open V shaped position to variably occlude the air passageways defined between adjacent vanes; or;

a substantially closed position in which both tabs are substantially coplanar with said vanes;

said output end of said main body comprising a generally rectangular deflector plate mounted at the top rear to insure the downward ejection of said agri-chemical being dispensed from spreader; and, said spreader adapted to compensate for uneven wind effects caused by such factors as prop rotation, prop (P)-Factor, aircraft design, and the presence of aircraft component parts such as landing gears, wing struts, oil coolers and the like.

2. The spreader as defined in claim 1 including a slotted quick connect plate adapted to be semi-permanently secured to said plane for receiving said upper sprayer mounting plate to secure said sprayer upon said plane.

3. An output adjustable agri-chemical spreader device adapted to be coupled to agricultural spray planes or the like for uniformly widely broadcasting a agri-chemical over a selected field, the spreader adapted to compensate for uneven wind effects caused by such factors as prop rotation, prop (P)-Factor, aircraft design, and the presence of aircraft component parts such as landing gears, wing struts, oil coolers and the like, said spreader device comprising:

a generally V-shaped main body portion having a central section, a top and a spaced-apart bottom, the top and bottom originating at the mouth of an input throat of a predetermined height and width, and the top and bottom rearwardly diverging to a larger width rear output end with a reduced height;

said mouth defined between a pair of angled side plates, an upper sprayer mounting plate, and a lower, forward facing angularly adjustable baffle plate adapted to be selectively adjusted for varying the intake rate of air into said spreader main body portion;

a plurality of internal spaced apart, arcuate vanes extending between said top and bottom of said main body having fronts secured in closely spaced apart relation within said mouth and terminating in farther spaced apart ends at said output end; and, said vanes terminating in angularly adjustable swallow tails for distributing said agri-chemical, said swallow tails each comprising a pair of cooperating tabs pivotally coupled at the rear of each of said vanes, each of said tabs being pivotally deflectable relative to the other, whereby the tabs can be adjusted to either;

a position to the left or the right relative to said vanes to compensate for prop (P)-Factor;

a substantially open V shaped position to variably occlude the air passageways defined between adjacent vanes; or;

a substantially closed position in which both tabs are substantially coplanar with said vanes.

4. The spreader as defined in claim 3 including a slotted quick connect plate adapted to be semi-permanently secured to said plane for receiving said upper sprayer mounting plate to secure said sprayer upon said plane, and said output end of said main body includes a generally rectangular deflector plate mounted at the top rear to insure the downward ejection of said agri-chemical being dispensed from spreader.

5. The spreader as defined in claim 4 wherein said throat comprises a transverse rod for securing the front of each of said vanes in a desired angular position and said main body portion includes a pair of diverging cooperating aerator scoops adjacent the sides of said main body portion adapted to intake and exhaust air during flight of said plane.

6. In an agri-chemical spreader device adapted to be coupled to agricultural spray planes or the like for uniformly widely broadcasting a agri-chemical over a selected field, the spreader being of the type comprising a generally V-shaped main body portion having a central section, a top and a spaced-apart bottom, the top and bottom originating at the mouth of an input throat of a predetermined height and width, and the top and bottom rearwardly diverging to a larger width rear output end with a reduced height wherein said mouth is defined between a pair of angled side plates, an upper sprayer mounting plate, and a lower, forward facing angularly adjustable baffle plate adapted to be selectively adjusted for varying the intake rate of air into said spreader main body portion, a plurality of internal spaced apart, acruate vanes extending between said top and bottom of said main body having fronts secured in closely spaced apart relation within said mouth and terminating in farther spaced apart ends at said output end, the improvement comprising:

a plurality of angularly adjustable swallow tails operatively associated with each of said vanes at the terminal ends thereof for distributing said agri-chemical, said swallow tails each comprising a pair of cooperating tabs pivotally coupled at the rear of each of said vanes, each of said tabs being pivotally deflectable relative to the other, whereby the tabs can be adjusted to either;

a position to the left or the right relative to said vanes to compensate for prop (P)-Factor;

a substantially open V shaped position to variably occlude the air passageways defined between adjacent vanes; or;

a substantially closed position in which both tabs are substantially coplanar with said vanes; and, whereby said spreader is adapted to compensate for uneven wind effects caused by such factors as prop rotation, prop (P)-Factor, aircraft design, and the presence of aircraft component parts such as landing gears, wing struts, oil coolers and the like.

7. The improvement as defined in claim 6 including a slotted quick connect plate adapted to be semi-permanently secured to said plane for receiving said upper sprayer mounting plate to secure said sprayer upon said plane, and said output end of said main body includes a generally rectangular deflector plate mounted at the top rear to insure the downward ejection of said agrichemical being dispensed from spreader.

8. The improvement as defined in claim 7 wherein said throat comprises a transverse rod for securing the front of each of said vanes in a desired angular position and said main body portion includes a pair of diverging cooperating aerator scoops adjacent the sides of said main body portion adapted to intake and exhaust air during fight of said plane.

* * * * *